United States Patent [19]
Downs et al.

[11] Patent Number: 5,864,221
[45] Date of Patent: Jan. 26, 1999

[54] DEDICATED AVIONICS STANDBY POWER SUPPLY

[75] Inventors: Stuart G. Downs, San Diego; Santos Cota, Warner Springs, both of Calif.

[73] Assignee: TRW Inc., Redondo Beach, Calif.

[21] Appl. No.: 902,563

[22] Filed: Jul. 29, 1997

[51] Int. Cl.⁶ .................................................. H02J 7/00
[52] U.S. Cl. ............................................................ 320/134
[58] Field of Search ................................. 320/102, 104, 320/109, 123, 130, 132, 134, 140, 163; 307/10.1, 48, 46, 47, 64

[56] References Cited

U.S. PATENT DOCUMENTS

| | | | |
|---|---|---|---|
| 3,623,139 | 11/1971 | Dickerson | 320/116 |
| 3,936,718 | 2/1976 | Melling et al. | 320/156 |
| 4,394,612 | 7/1983 | Emerle et al. | 320/152 |
| 5,168,205 | 12/1992 | Kan et al. | 320/160 |
| 5,500,579 | 3/1996 | Kim et al. | 320/109 X |

*Primary Examiner*—Edward Tso
*Attorney, Agent, or Firm*—Michael S. Yatsko; Ronald M. Goldman

[57] ABSTRACT

A standby power supply dedicated to a peripheral electronics apparatus on aircraft provides an isolated ungrounded self-contained source of DC operating voltage. That source is applied to the electronics apparatus upon indication of turbine generator shut-down or failure before the voltage generated by the turbine generator completely falls off. Formed with an EMI filter, a fast pulse mode battery charger, a lead-acid battery pack, a DC to DC converter, and a pair of electromagnetic relays, the standby power supply ensures that the electronic apparatus is never without operating power even momentarily.

9 Claims, 5 Drawing Sheets

DEDICATED AVIONICS STANDBY POWER SUPPLY

FIELD OF THE INVENTION

This invention relates to standby power supplies, and, more particularly, to a dedicated miniaturized standby power supply for airborne electronics device application.

BACKGROUND

A standby electrical power generator or power supply functions in an electrical supply system as an alternative source of electrical power to substitute for the principal power generator or power supply, should the latter fail or be shut down. Requisite power continues to an electrical load, typically, an electronic or electrical apparatus that one wishes to continue to function, notwithstanding interruptions in the principal power generator or supply. The switchover to the standby supply may be accomplished by devices as simple as an electromagnetic relay. The relay switches its relay contacts when the principal power supply fails and substitutes the back up power supply in the power distribution circuit, and, alternatively, switches back again when the principal power supply is restored. In general, many of those standby power supply techniques are known and may be found in industrial practice.

One particular application of power generators and power supplies and standby power supply systems is found within aircraft. Modern aircraft contain various electrical systems which consume, store, and/or generate electrical power; and electrical distribution systems for distributing the electrical power generated to the various electrical systems within the aircraft or, as variously termed, electrical loads. One such electrical load is the electrical motor that starts the aircraft's turbines; another is the radio; still another is the battery.

Much like the automobile, the aircraft contains a large battery, which stores charge which can be used to supply direct current ("DC") electricity and serves as a standby supply. When the pilot operates the start key, current from that battery enables electrical motors to start the aircraft's turbine. Once started, the engine continues operation through internal combustion of petrochemical fuels, and does not require continued energy depletion of the battery. Instead the engine spent electrical.

In addition to producing thrust, the aircraft's engines drive a turbine generator which in turn generates AC or DC power of a high voltage. That respective AC or DC power is distributed to a number of respective AC-to-DC or DC-to-DC converters which in turn supply electrical power at other voltages, either higher or lower voltages. A portion of the DC power being generated is typically used to replenish or recharge the main battery; that is, replenish the electrical energy drained from the battery in order to start the engines and to supply a steady "trickle charge current" to replace electrical energy that is gradually lost from the battery through the battery's internal leakage resistance. That trickle charge current procedure ensures that the battery remains at peak capacity to allow for subsequent engine starts.

When the aircraft is parked and its engines shut down, the turbine generators no longer generate electricity. The battery then serves as a standby power supply. All electrical systems should likewise be shut down, except for those few essential electronic devices that are intentionally designed to have continued access to the craft's main battery. As in the automobile, some electrical systems, such as an electric clock, remain connected to the main battery so that the systems may continue to operate even when the engine is not running.

Continued post engine shut down operation of those few essential electronic devices creates additional drain on the battery. Unless eventually recharged, the battery will eventually be drained of its stored electrical charge. Typically battery charging apparatus is on hand at the aircraft hangers for connection to the aircraft's distribution system. Operating from the land based electric utility system, as example, the portable battery charger serves the need to maintain the battery's charge, while the aircraft is parked over the long term. The foregoing aircraft electrical power supply system, supply back up and recharging apparatus would seem complete and covers every option to preclude unavailability of DC power.

Aircraft manufacturers are first concerned with having the aircraft remain airworthy for the safety of pilot and passenger. The power generation and distribution systems are designed and installed to meet that goal, and, as history attests, succeeded in that goal. While large airliners with access to service at major airports easily avoid dead batteries, smaller aircraft do not always operate under conditions in which they obtain the luxury of major airport service. They may operate in airports that are little more than a hanger and a runway, unequipped with sufficient battery chargers for available aircraft, and, sometimes, even without electricity.

The foregoing circumstance is particularly true for military aircraft. By design some military aircraft are intended to operate from clearings in the wilderness where no electricity is available. Unlike large commercial airliners, the design of aircraft for operation in such harsh environment requires a greater degree of self-sufficiency. The military aircraft cannot rely on support service always being available.

The foregoing briefly describes a few circumstances in which it is preferable to eliminate any drain on the aircraft's main battery and conserve that energy when the engines are shut down. A number of peripheral electronic avionics devices, not available from the aircraft manufacturer, are often installed in aircraft, particularly in military aircraft. Most of those electronic avionics devices are not intended for operation when the aircraft's engines are shut down. However, at least one such apparatus, the cryptographic messaging apparatus, should desirably continue in operation. Although such peripheral apparatus is given access to the aircraft's power distribution system for electric power when the engines are running, it is not desired to provide battery access for that apparatus when the engines are shut down.

One reason for a back up supply for such peripheral equipment is convenience. As example, the cryptographic electronic equipment requires the pilot to manually insert certain data into the apparatus, where that data is stored in random access memory. Should power to that apparatus be removed, the data in the memory is erased. The pilot is then required to repeat the laborious task of re-entering the data in order to use the cryptographic apparatus.

Those factors are not of concern to the aircraft manufacturer, who does not address them. To require the aircraft's entire electrical distribution system to comply with those requirements would raise the cost unnecessarily. The present inventors realize that the peripheral electronics apparatus should carry its own standby power source and rely on the main power source only when the aircraft's turbine engine is running.

Accordingly, an object of the present invention is to provide a standby power source within an aircraft's peripheral electronic communication equipment that is separate from any standby source for the aircraft's principal power system and dedicated to that communication equipment.

It is another object of the present invention to provide a standby power source for aircraft peripheral electronic equipment that is miniaturized and, more particularly, mechanically fits within a known SEME format.

It is a further object of the invention to ensure that an aircraft's peripheral electronic apparatus receives operating current continuously without even momentary interruption even in the event of failure or shutdown of the aircraft's turbine generator.

And it is a still further object of the invention to provide a standby power source to an electronic apparatus that normally receives electrical power over the main distribution line while maintaining practical electrical isolation between the standby power source and the main distribution line.

SUMMARY OF THE INVENTION

In accordance with the foregoing objects, a standby power supply dedicated to a peripheral electronics apparatus on aircraft provides an isolated ungrounded source of DC operating voltage that is applied to the electronics apparatus upon indication of turbine generator shut-down or failure before the voltage generated by the turbine generator completely falls off. By monitoring the turbine generator's output DC voltage, a falling voltage is sensed. The standby supply thereupon supplies battery stored electricity to the electronic apparatus. Advantageously the standby power supply is formed within a SEM-E format, physically presented in a very shallow container of about 6 inches by 6.7 inches and about 0.6 inches in thickness for easy insertion within a SEM-E format panel rack.

The standby power supply includes an Electromagnetic Interference ("EMI") filter, a fast pulse mode battery charger, a lead-acid battery pack, a DC to DC converter, and a pair of electromagnetic relays.

Normally, one relay in the pair detects the availability of the main power source voltage, typically 270 volts, on the aircraft's principal distribution lines and responsively connects a lower 28 volt DC voltage distribution line to the EMI filter and, thereby, through to the battery charger, which supplies charging current to the battery pack. The second relay in the pair also detects main power source voltage availability and, as complement to the first relay, responsively isolates the battery from the DC to DC converter, so that no electrical power is supplied by the standby unit to the associated electronic apparatus during periods in which the main power source voltage is available.

The imminence of the aircraft's main 270 volt source power failure, is signaled to the second relay, which operates, and closes a circuit from both the battery and the charger output to the DC to DC converter. This permits the standby circuit to commence the supply of power, overlapping the existing power arrangement for a short interval. That overlap ensures that the electronic equipment is never without power, even for an instant, and minimizes the generations of transients as would exist were one source of power shut off and an alternate source of power applied shortly after.

When the aircraft generator is turned off, the 270 Volt DC main output voltage rapidly plummets. That transition is detected by the aircraft's power failure detector, which produces an output before the main voltage completely terminates. A switch, associated with the second relay, detects the power failure detector's action and interrupts the second relay's energization circuit. In de-energizing, the second relay connects the DC battery's output to the input of the DC to DC converter. The first relay thereafter responds to the drop-off in voltage and interrupts the power input circuit, isolating the EMI filter and battery charger from the aircraft's main power distribution lines and thereby preventing radiation emissions from being conducted either into or out of the unit over the main distribution lines.

As an advantage, the EMI filters prevent any extraneous high frequency circulating on the 28 VDC distribution lines from entering the standby supply, and, hence, from propagating to the associated electronic apparatus. Conversely, the filter prevents such kind of conducted emissions from propagating back into the 28 VDC distribution lines as well.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

DETAILED DESCRIPTION OF THE PREFERRED EMBODIMENTS

Figure 1:
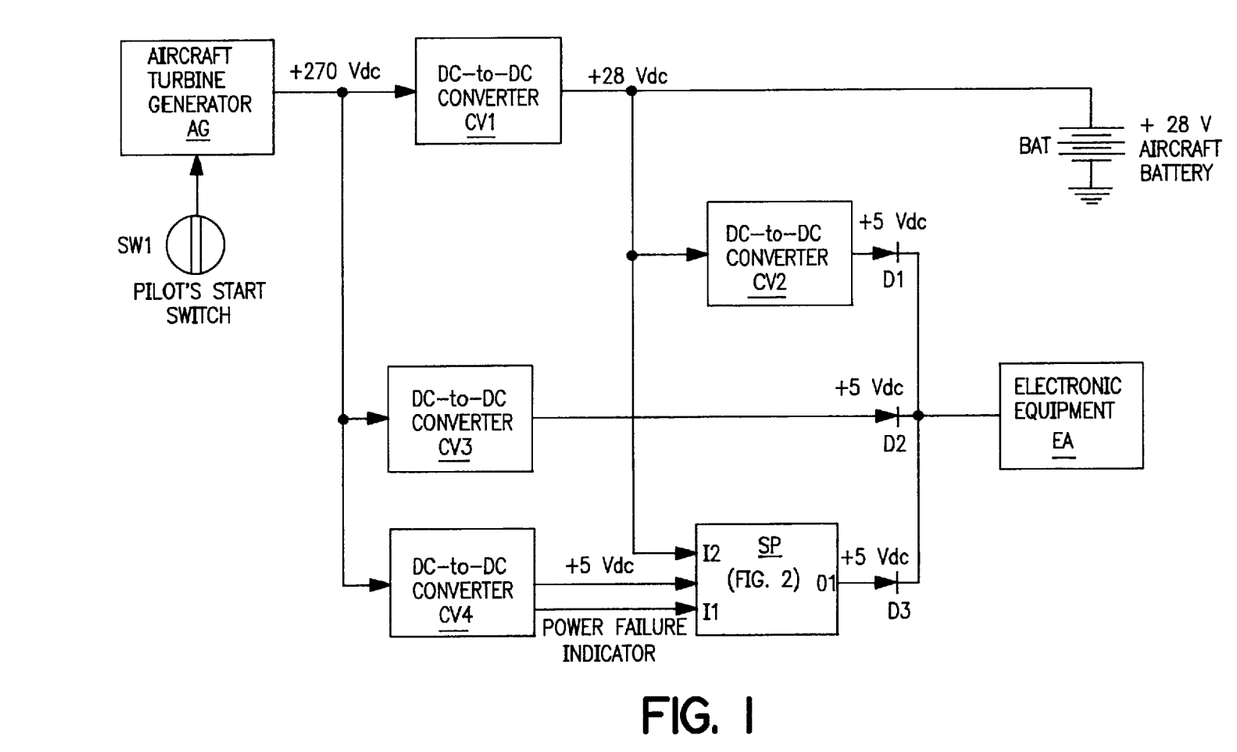
FIG. 1 is a block diagram that illustrates the position of the dedicated standby power supply for an electronic apparatus within an aircraft's electrical system.

To better understand the invention, it is helpful to preliminarily consider the configuration of electrical generation in modern aircraft and the application of that generated power to the electronics apparatus serviced by the dedicated standby power supply invention that is generally represented in FIG. 1 to which reference is made. As represented in block form, when operating, the aircraft generator AG in modern aircraft generates a DC voltage, for example 270 volts DC. The 270 volt DC system serves as the principal electrical distribution network for the aircraft. That voltage is down-converted to a lower voltage by various DC to DC converters, such as converters CV1, CV3 and CV4, to a lower DC voltage level, for example 28 volts DC and 5 volts DC respectively. Electricity at that 28 volt voltage is distributed over a pair of electrical leads throughout the aircraft to electronic systems, to other DC to DC converters, such as represented as CV2, which produces a lower DC voltage, 5 volts, and to the aircraft's battery BAT.

Electronic system EA represents the electronic system served by the present standby power supply SP. Battery BAT serves as the back up when the generator is not operating and furnishes DC operating current to the various equipment that one desires to operate during that down-time, excluding electronic apparatus EA hereafter discussed.

Typical aircraft also include additional DC to DC converters, such as converter CV3 and CV4, that converts the higher 270 volts to still smaller voltages, such as five volts DC, and, in the present system, that five volts DC is distributed directly and indirectly to electronic system EA. DC to DC converter CV4 is output to the standby power circuit SP. And an output of DC to DC converter CV1 supplies 28 VDC to an input of standby power supply SP as well.

As is conventional practice, the electrical power leads into the electronic equipment EA includes three diodes, diode D1, diode D2 and Diode D3, forming a "diode OR'ed" circuit to the electronic equipment. The diode allow current to flow into, but not out of, the electronic equipment. In that way, the diode prevents the five volt outputs of converters CV2, CV3 and CV4 from serving as an electrical load.

When the pilot operates the start switch SW1, symbolically represented, in FIG. 1 DC current from the battery enables turbine generator AG to start, and, being self propelled, the generator continues thereafter on its own source of energy. The generator produces the electrical power for the converter CV1, which drops the voltage to the 28 VDC level and current from converter CV1 thereafter supplies the operating current for the equipment and replaces the electrical charge earlier drained from battery BAT, that is, recharges the battery.

For reasons not here relevant, electronic apparatus EA, is not permitted to be supplied with operating current from battery BAT, when turbine generator AG is not operating. Thus, it is necessary for that equipment to have a separate standby power source dedicated to furnishing the requisite current, which the present invention satisfies.

Further, modern aircraft that contain multiple DC-to-DC converters also typically contain a power failure indicator, ("PFI"). The power failure indicator monitors the DC voltage level output from the turbine generator. If the DC voltage level falls from the nominal 270 volt level by approximately twenty two per cent to, say 210 volts, as it would do during a failure, the power failure indicator circuit outputs a PFI signal. This occurs within one microsecond. Normally the power failure indicator outputs a certain voltage, which can occur only when the turbine generator is operating. The withdrawal or termination of that certain voltage, such as by dropping the voltage output to a zero volt level, serves as the power failure indication. By providing a voltage when functioning normally, one is assured that the PFI is properly functioning. The PFI signal is represented in FIG. 1 by line (PFI), illustrated as associated with DC-to-DC converter CV4.

The decline in voltage detected by the PFI is presumed to indicate that the turbine generator is either failing or has been shut off. For one, that PFI signal is typically used to trigger an alarm at the pilots panel. For another, the PFI signal is used to shut down various electronic equipment, whose components could otherwise be damaged by the drop in voltage, before the principal voltage falls much lower.

As the generator fails, the voltage continues to drop off over a short interval and ultimately falls to zero. In a typical application, the PFI signal occurs approximately fifty microseconds before the turbine generator's voltage falls from 210 volts to zero volts. The PFI signal is used in the principal embodiment of the present invention as hereafter described in detail.

The standby power supply of the present invention, represented by block SP, contains an input, I1, connected to the PFI signal output, connected through converter CV4, and another input I2 connected to converter CV4's five volt DC output. The standby supply's output, 01, is connected via diode D3 to the power input of electronic apparatus EA as better illustrated in the schematic of FIG. 2A and 2B, hereafter discussed.

Supply SP's output is ungrounded, as hereinafter described. Being ungrounded, current from the standby source cannot find its way into the leads of the principal distribution circuit. This serves as an additional degree of isolation and protection in addition to that isolated provided by the Diode OR'ed circuit.

Figure 2A:
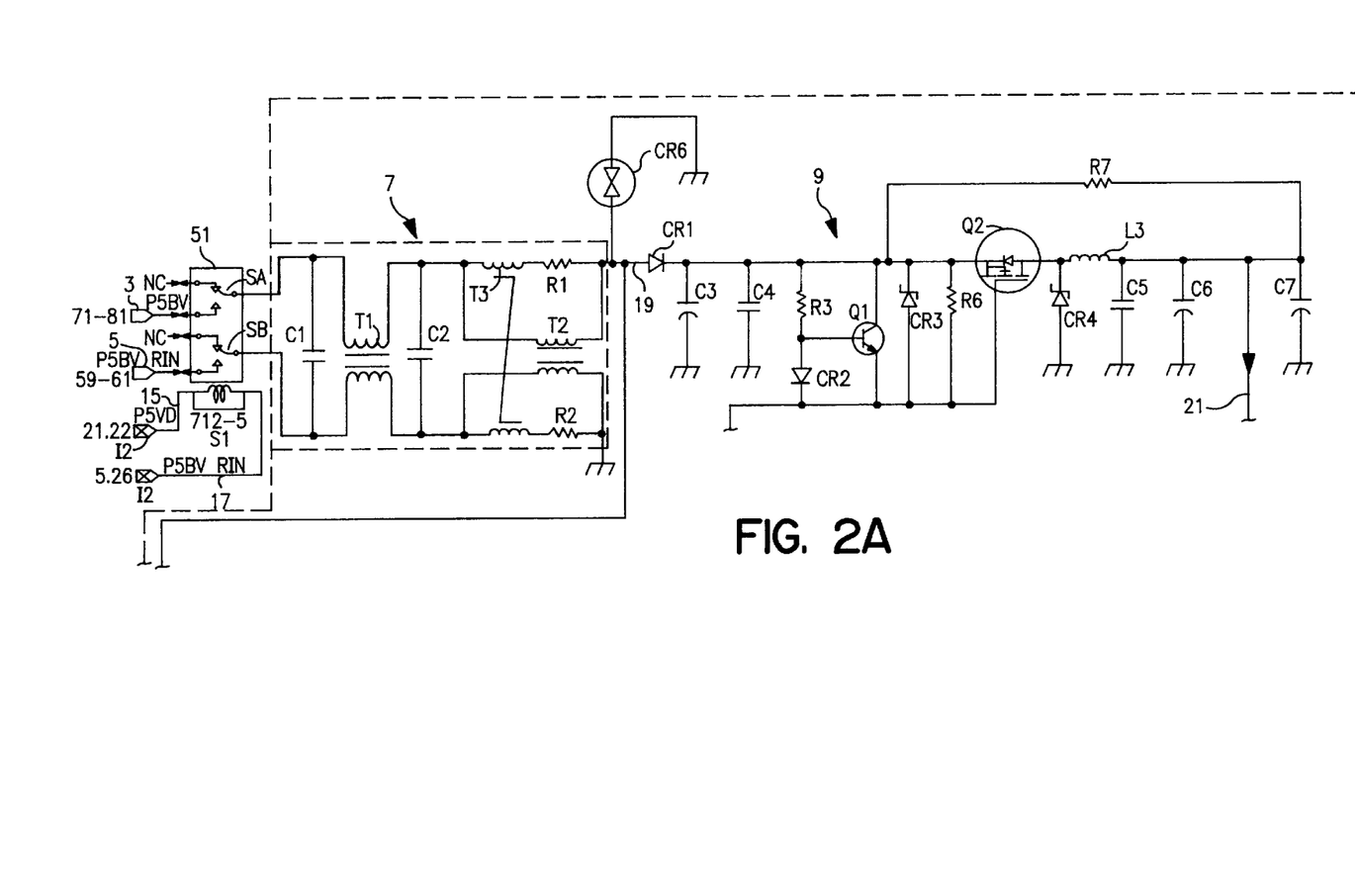
FIGS. 2A and 2B are schematics of an embodiment of the invention generally represented in FIG. 1.
Figure 2B:
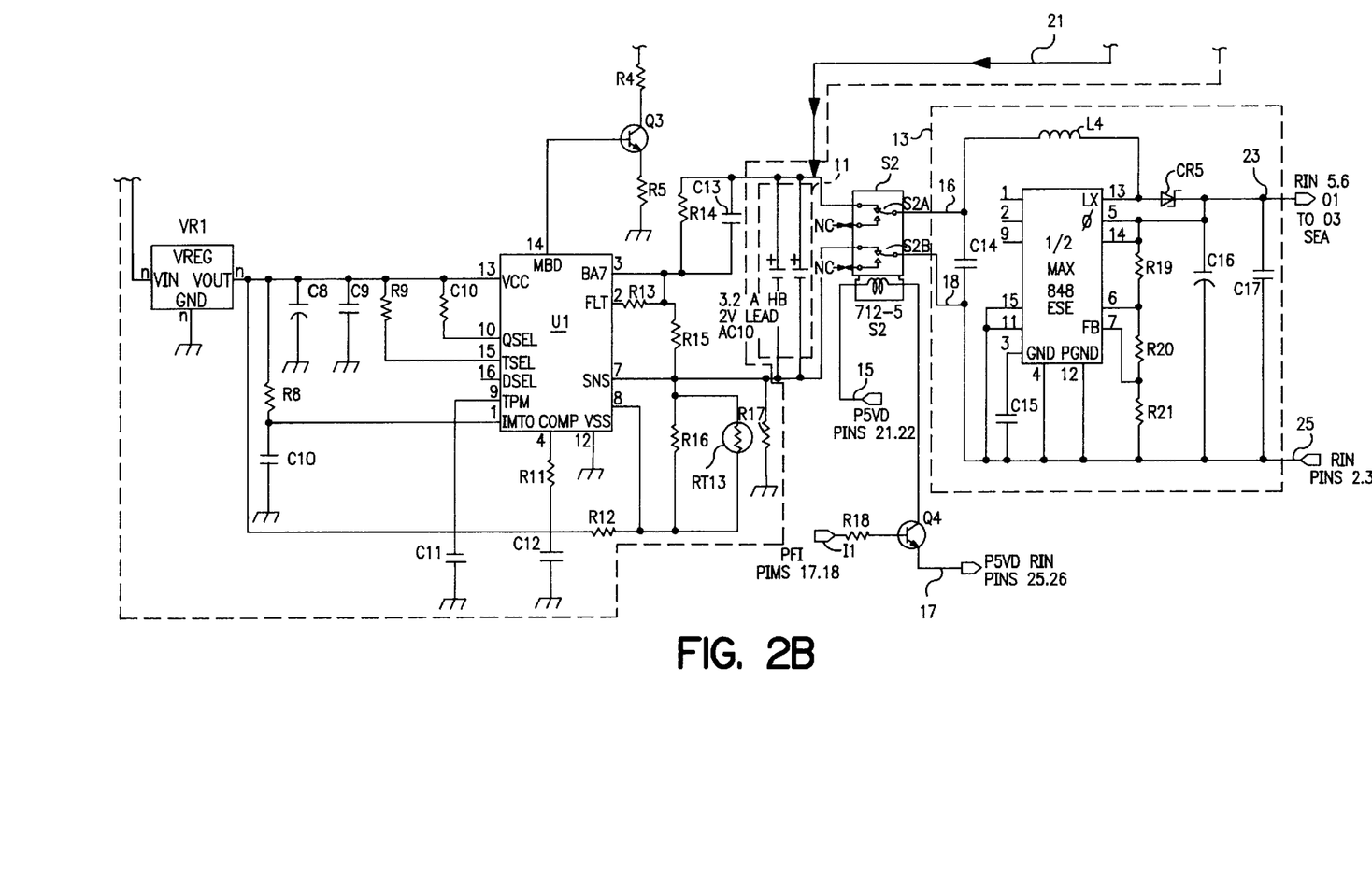

Reference is made to the embodiment of the invention illustrated in FIG. 2. As illustrated in this schematic drawing, the principal constituent elements of the standby power supply include the power inputs 3 and 5, electromagnetic relay S1, the EMI filter section 7, the fast pulse mode battery charger 9, the lead-acid battery pack 11, electromagnetic relay S2, a DC to DC converter 13 and output leads 23 and 25, which serve as the outputs to the standby supply.

Relay S1 includes two sets of contacts SA and SB. Each of those sets includes at least a make contact and a transfer contact. As shown the contact sets also include a break contact, which is not used. One of the make contacts is connected to one of the DC power input leads 3 and the corresponding make contact of the second set is connected to the other DC power input lead 5. Those leads extend to the power distribution system within the aircraft to which the DC converter CV1 of FIG. 1 supplies the 28 VDC. When the relay is energized, the transfer contact in each set, moves from electrical contact with the break contact, into electrical contact with the make contact, completing an electrical circuit there between.

The leads 15 and 17 to the electromagnetic coil of relay S1 are connected to the corresponding leads of a second low voltage DC power distribution system within the aircraft, corresponding to the distribution system supplied by CV4 of FIG. 1. That power distribution system provides five volts DC at those leads, when the aircraft's turbines are operating. DC current from that source supplies the energizing current to the relay's coil.

The transfer contact of each contact set SA & SB is connected to the leads of EMI filter 7. The filter eliminates high frequency signals that may be propagating along the 28 volt DC distribution lines from the aircraft's generator or harmonics within the DC voltage and prevents those signals from propagating to the standby power supplies power processing circuit Q2 and elsewhere. Conversely, the filter also prevents any high frequency signals generated within the charging circuit from propagating from the standby supply back into the aircraft's 28 volt DC distribution lines.

EMI filter 7 is formed of three toroidal inductors T1, T2, and T3, wound on separate ferromagnetic cores, capacitors C1 and C2 and resistors R1 and R2. The inductor winding resistances are negligible and may be disregarded. Each inductor contains two windings. The positive magnetic polarity end of each winding is marked in the figure by the conventional dot.

The windings of toroid T1 are respectively connected in series with the positive and negative electrical lines, capacitor C1 is connected across the input ends of each of those windings to shunt high frequency signals, and capacitor C2 is connected across the remaining ends of each of the two toroid windings. As also illustrated in the FIG. 2, one winding of T2 is placed in series with the positive lead to the EMI output, and the other winding of T2 is connected in series between the negative lead and chassis ground.

It is important to note that the chassis ground is not the same ground used in the 28 volt distribution system. The chassis ground is connected through the resistances and windings and through the contacts of relay S1 to the 28 volt distribution system ground only when relay S1 is operated.

Otherwise the two grounds are isolated from one another and a potential difference may exist between those different grounds.

One winding of inductor T3 is connected in series circuit with resistor R1 and that series circuit is connected in parallel with one of the windings, the uppermost one in the figure, of inductor T2. The second winding of inductor T3 is placed in series circuit with resistor R2 and that series circuit is placed in parallel with the other winding of inductor T2 between the negative lead and chassis ground. As indicated, the polarity of the windings of inductor T2 is opposite to that of the corresponding windings of inductor T3 which are placed in the parallel circuit in each of the two circuit branches.

The DC input of EMI filter 7 is protected against any spurious voltage spikes by a Transorb CR6, a device which limits the magnitude of any voltage spikes, either positive or negative, to a predetermined level, suitably 40 volts.

The rechargable battery pack 11 is formed of two sealed rechargeable "flat pack" lead-acid batteries, which are placed in parallel circuit. In physical size, each battery measures about 4.6 by 2.5 by 0.3 inches and together the two batteries occupy a space no greater than seven cubic inches. The dimensions allow the batteries to easily fit within the prescribed volume for the power supply. Suitably, the batteries have a nominal voltage output rating of 2 volts and such batteries should be able to store as much as 3.2 ampere hours of charge. Such batteries are marketed by Portable Energy Products, Inc. of Mountain View, Calif. Although two batteries form the battery pack in this embodiment, lesser numbers of batteries may be used in the pack if lower ampere-hours of storage capacity is desired.

The fast pulse mode charger 9 receives 28 volt filtered DC current at node 19 and provides the charging current to replenish battery pack 11 via output 21. It provides that charging current only so long as the 28 volt DC power at terminals 3 and 5 and the +5V DC at terminals 15 and 17 are supplied by the aircraft turbine generator.

A protective diode CR1, connected in series with the positive lead, prevents reverse current from the battery charger back through EMI filter 7 and into input line 3.

The power to battery 11 is supplied and controlled through a form of Buck regulator circuit that comprises a P-channel enhancement mode field effect transistor Q2, Zener diode CR3, resistor R6, Capacitors C3 and C4, resistor R3 and diode CR2 and transistor Q1, on the input side of Q2, and Resistor R7, Zener diode CR4, filter inductor L3, and capacitors C5, C6, and C7 on the output side. The Buck converter possesses a controllable duty cycle, wherein the quantity or percentage of current that it may pass through to its output is a function of its duty cycle, and a control input for setting that duty cycle responsive to a control input voltage. These types of switched DC to DC converters are known and is included in the cited literature. An article authored by Wester et al appearing in the IEEE transactions on Aerospace and Electronic Systems, Vol. AES-9, No. 3, pp 376–385, May 1973, contains additional information on Buck converters.

The collector to emitter circuit of a switching transistor Q3, in series with resistors R4 and R5 provides a return current path from the gate of Q2 to chassis ground and from one side of CR2, Q1, CR3 and R6 to chassis ground. The switching transistor Q3 controls whether Q2 is in an electrically conductive state or not. That switching transistor in turn is controlled by the control circuit chip U1.

Control chip U1 is an application specific integrated circuit chip state machine that accomplishes two primary functions: lead-acid battery charge control and switch mode power conversion control. It contains pulse width modulation control circuitry to support switch mode voltage and current regulation. A state machine, a predecessor device to the modern microprocessor, is a sequencing and logic device that sequences its operations and performs algorithms in steps prescribed by a hard-wired program and contains decisional logic devices.

One such chip is the BQ 2031 chip available from the Benchmarq Microelectronics, Inc. The accompanying circuitry in this power supply incorporates the necessary resistances, capacitances and other elements and circuit connections generally described by the Benchmarq company in its published application notes and specification sheets dated December 1995 and June 1996 for the cited chip. The application notes provide helpful operational theory and design considerations for determining details such as resistance values and the like, to which the interested reader may make reference. It should be noted that the various inputs and outputs to the chip are designated in the figure by Mnemonic symbols as well as by pin numbers. The latter pin numbers should not be confused with the numbers used to identify the elements of the combination.

That control chip contains multiple operational battery charging control modes for selection by the user for a specific application. In the present application the mode selected is the fast charging pulsed current mode. In this mode the charging current is regulated at maximum until the voltage of the cell rises to the level specified by the manufacturer. Then the charging current is removed until the battery voltage falls to its float or trickle charge level, after which charging current is restored and regulated at maximum until the battery again rises to the proper level. This latter step is repeated indefinitely.

The charger's control chip U1 obtains its operating voltage from the filtered DC input from the external generator at 19 applied to voltage regulator VR1. The voltage regulator steps down the 28 volt input voltage to the lower voltage, suitably +5V DC, required to power and bias the control circuit chip U1. The control chip's output MOD connects to the control input, the base of NPN switching transistor Q3. That switching transistor is biased to either its conductive or non-conductive state in dependence upon the voltage supplied from output MOD.

Capacitors C8 and C9 are connected between the positive output of VR1 and ground to provide capacitive filtering or smoothing of the voltage. Voltage from VR1 is applied to VCC, via resistor R10 to power input QSEL, via resistor R9 to power input TSEL; and via high value resistor R8 to the TMTO input of control chip U1. A very small capacitance C11 connects the TPM terminal to circuit ground; a series R-C circuit formed by Resistor R11 and capacitor C12 connects the COMP terminal to circuit ground; and the VSS terminal is connected directly to circuit ground. This provides the operating and bias voltages for the chip. A small capacitance C10 is connected between the TMTO output and circuit or chassis ground, and forms a series R-C circuit with resistor R8. Capacitor C11 at input TPM sets the chip's internal clock, which, in the practical embodiment later described, is set at 100 KHz.

The batteries state of charge is monitored by sensing the voltage drop produced across resistor R17 at the sense input SNS of control chip U1. The current through battery pack 11 flows also through the small value series resistance R17 to chassis ground. That current produces a small voltage drop across resistor R17. That voltage drop is directly proportional to the level of current. Accordingly the drop serves as a convenient measure of charging current.

The voltage at the positive battery terminal is coupled via the parallel R-C circuit, high value resistance R14 and small value capacitance C13 to the BA7 input of control chip U1. This voltage serves as a convenient representation of the batteries state of charge. When the batteries are discharged, the batteries voltage is substantially less than the nominal 2 volt value and the charging current should be large; when fully charged the voltage across the battery is higher than the nominal value and the charging current should be small.

Advantageously, the control chip incorporates temperature protection, which is accomplished as follows: The five volts from regulator VR1 is applied to the series circuit R12 and the parallel combination of R16 and thermistor RT 13 to SNS input and one side of resistor R17, which are at a very low voltage, near ground potential. The voltage at the mid-point on that voltage divider, the voltage drop across the thermistor RT 13, is connected to control chip U1's temperature sense input TS. That voltage serves to indicate the battery temperature. The voltage drop varies in dependence upon the resistance level of thermistor RT 13, which, in turn, is variable in dependence on the sensed temperature.

Thermistor RT 13 is physically located between the two batteries in battery pack 11 and senses the battery pack temperature. The thermistor's resistance varies in dependence on the temperature sensed. Should the temperature attain a predetermined limit or maximum temperature, charging should be terminated to avoid damage to the batteries. In the practical embodiment, the chip U1 is designed to shut down charging at five degrees Centigrade. At that limit temperature the thermistor's resistance increases, increasing the voltage at TS 8. In the course of operation or "run" of the chip's internal program, that terminal is checked. If the level is too high, the chip responds by preventing any output at PIN 14 (MOD). As a consequence, transistor Q2 is rendered non-conducting, and no further charging current is output to the battery pack.

Resistor R13 connects between the BA 7 input and the float input FLT. Resistor R15 connects between the float input and the sense input SNS. These resistors program the voltage float level. Control chip U1 provides three stages of output at MOD in dependence upon the voltage sensed at BA7. The output is a repetitious series of voltage pulses of a particular width and those pulses are separated by a duration of no voltage or dwell time. The control chip adjusts or varies the duration of the output pulse at MOD, which in turn controls the state of conductivity of transistor Q3, alternating between conductive and non-conductive states. If the duration of the pulse is of a first level, transistor Q3 is maintained in its conductive state for a longer time, comparable to a 80% duty cycle. If the pulse duration is of a second level, a shorter output pulse width of 50% duty cycle results. And if of a third level, a still shorter pulse width, comparable to a 20% duty cycle, the latter of which represents a trickle charge level for the battery pack. In the practical embodiment the foregoing duty cycles correlate to 2, 2.25 and 2.55 volts, respectively.

Field effect transistor Q2 and associated components CR4, L3, C5 & C7 forma a classic step down Buck converter. A negative source to gate voltage on FET Q2, which acts as a switch, switches FET Q2 into its conducting state or "on". Transistor Q2's "on" time is determined by the duty cycle from the MOD output of semiconductor U1. With Q2 on, current starts conducting through L3 to charge capacitors C6 and C7. The windings of inductor L3, with conducting current, create a magnetic field. When Q2 turns "off", switching back to its non-conducting state, as determined by the duty cycle from the MOD output of U1, current continues to flow through inductance L3, generated by the now collapsing magnetic field in that inductor. The voltage at the cathode of CR4 goes negative during this interval, causing CR4 to become forward biased and thereby providing a current path for inductor L3. In this manner, voltage and current of the correct magnitude is supplied to the rechargeable batteries. This voltage and current level is determined by semiconductor U1 and its associated components by direct duty cycle control at the MOD output of semiconductor U1.

Transistor Q1 is a "speed-up" transistor and causes field effect transistor Q2 to shut off more quickly than otherwise. When transistor Q3 switches into its conductive state, it causes transistor Q1 to switch to its non-conductive state. When Q3 turns off, Q1 conducts current, discharging the charged capacitor in the source to gate of transistor Q2. And that action causes FET Q2 to turn off more quickly.

The foregoing process repeats with each duty cycle. As transistor Q2 is continuously pulsed on and off, the voltage generation continues. This is a "buck" type of action. Voltage and current supplied through the buck converter is always under direct duty cycle control.

The conduction of transistor Q3 is caused by a five volt drive signal from the MOD output of U1. This high output corresponds to the high pulse of the duty cycle, while a low signal output, around zero volts, corresponds to the low portion of the duty cycle. The duty cycle period, T, is set by capacitor C11 and is of a frequency of about 100 Khz. Duty cycle "on" time is the time that Q3 and correspondingly Q2 are in their conducting state. During a given cycle, U1 sets the relative proportion of that cycle in which transistor Q3 is ON or OFF, and it can adjust or vary that portion in succeeding cycles of operation, thereby varying the Buck converter's duty cycle. It is this ON time that varies, pulse by pulse, to achieve the desired effect, which is the control of the voltage and current to the batteries.

Relay S2 includes an electromagnetic coil and a pair of transfer contact sets S2A and S2B. Each set includes a break contact, a make contact and a transfer contact. The break contact of the first contact set is connected to the positive polarity output of battery 11. The break contact of the second contact set is connected to the negative polarity or ground side of battery pack 11. The transfer contact of each set is connected to the positive and negative polarity inputs, respectively, of the DC to DC converter 13. The make contacts of the relay serve no function in this circuit and remains unconnected.

The electromagnetic coil of relay S2 is connected in series circuit with the collector to emitter circuit in NPN type transistor switch Q4 across the positive and negative leads 15 and 17 of the +5V DC output of DC-to-DC Converter CV4, the same connections are made for the coil of relay S1. The base of transistor Q4 is connected to the PFI monitoring circuit at input I1 associated with the principal 270 volt DC power generator, illustrated as PFI in FIG. 1.

In the steady state condition, when the aircraft's generator is operating properly, a voltage is present at PFI. With that voltage at its base, transistor Q4 is biased to conduct current; and, with the 5 Volts at lead 15 and with ground at lead 17, supplied indirectly by the aircraft generator, current flows through transistor Q4 and the relay coil, energizing the relay, which is the relay's normal operating condition. With the relay energized, the transfer contact of each of the two contact sets, S2A and S2B, is moved away from the associated break contact, and interrupts or opens the electrical supply circuit between battery pack 11 and the power inputs to the DC-to-DC converter 13. The DC to DC converter 13 consequently does not supply power to outputs 23 and 25 during this period.

When the aircraft turbine is being shut down, the voltage earlier applied over PFI to the base of switching transistor Q4 terminates, and no voltage is present. With zero volts at its base, transistor Q4, normally conducting, switches into a non-conducting state. As a consequence, at that stage, the energizing current in the relay's coil ceases. This termination of current occurs even before the voltage at leads 15 and 17, and also that at leads 3 and 5, drops off completely. Relay S2 is deenergized and restores its contacts to the unoperated state, which is the condition of contacts S2A and S2B, illustrated in the figure. In that condition, the relay's break contacts are in contact with the transfer contacts and it is seen that battery pack 11 is connected in circuit through those relay contacts to the DC power inputs of DC to DC converter 13.

When relay S2 is deenergized, connecting the positive and negative polarity terminals of battery pack 11 through to the corresponding pair of inputs 16 and 18 to converter 13, via closed relay contacts S2A and S2B, respectively, the converter steps up the +2V DC provided by battery pack 11 to a higher level, +5V DC as example, and applies that output voltage, via a boost rectifier CR5 to its outputs at 23 and 25. DC current at that voltage is distributed via distribution lines, not illustrated, to the external electronic apparatus, not illustrated, which consumes the DC power.

DC-to-DC converter 13 is a synchronous mode DC to DC converter. In the preferred embodiment, DC to DC converter 13 is formed with a power converter chip, such as is marketed by the Maxim company as model 848ESE. One of the leads is connected to input pin 13 via inductor L4, and the outer lead is connected to the circuit common at lead 25. Schottky diode CR5 feeds current through the resistor divider network R19, R20 and R21 to the circuit common at lead 25. The resistors form a voltage divider 0network, providing appropriate voltages to chip inputs (5 & 14) and (pin 6), and (pin 7), respectively. Pins 5, 11, 4 and 15 of the chip are connected to the circuit common. Capacitor C15 is connected between pin 3 and the circuit common and serves to select the DC to DC converter's switching frequency. The Schottky diode's output is filtered by a large capacitance C16 and, additionally, a small capacitor C17 serves to short circuit high frequency signals or high harmonics from across the output leads 23 and 25.

Neither of the two output leads 23 and 25 of power converter 13 is connected to the electrical or chassis ground, but is isolated therefrom. Thus, the output of the converter "floats" relative to the chassis ground referred to earlier.

When the aircraft's principal generator is operating normally and indirectly supplying 28 volt DC to the input leads to the standby supply at 3 and 5, it is also supplying DC voltage to the external electronic apparatus. The latter includes the electronic apparatus that is connected to the output of the standby circuit via output leads 23 and 25, served by this standby supply. The pulse mode charger's function is to at least trickle charge battery pack 11 at this stage. In this circuit condition, the aircraft control supplies current through leads 15 and 17 to the relay coil of relay S1, energizing the relay. The relay operates and closes its contacts SA and SB, thereby extending the positive and ground leads from the aircraft generator into the input of the filter 7 and pulse mode charger 9, and applying the 28 VDC across that input. Concurrently DC current is supplied to the serial connection of the coil of relay S2 and the collector to emitter of switching transistor Q4, which, absent a PFI voltage at its base, is in the current conducting condition, to energize relay S2. Relay S2 operates and opens its normally closed contacts S2A and S2B, as illustrated in the figure. Those open contacts interrupt the electrical circuit between the battery pack 11 and the inputs of the DC to DC converter 13, thereby isolating one portion of the circuit from the other.

With two sets of power supply leads, one from the aircraft's generator and another set from the DC to DC converter output, those distribution leads will conventionally contain protective devices, such as diode networks or other equivalent means, for preventing DC current from the aircraft generator from flowing back into the DC to DC converter 13. Likewise, it contains like protective circuits for preventing DC current produced by the DC to DC converter from flowing into the electrical distribution circuit for the Aircraft's generators, as would cause the DC to DC to overload, as the DC to DC generator is designed to provide current sufficient to operate only the external electronic apparatus.

Figure 3:
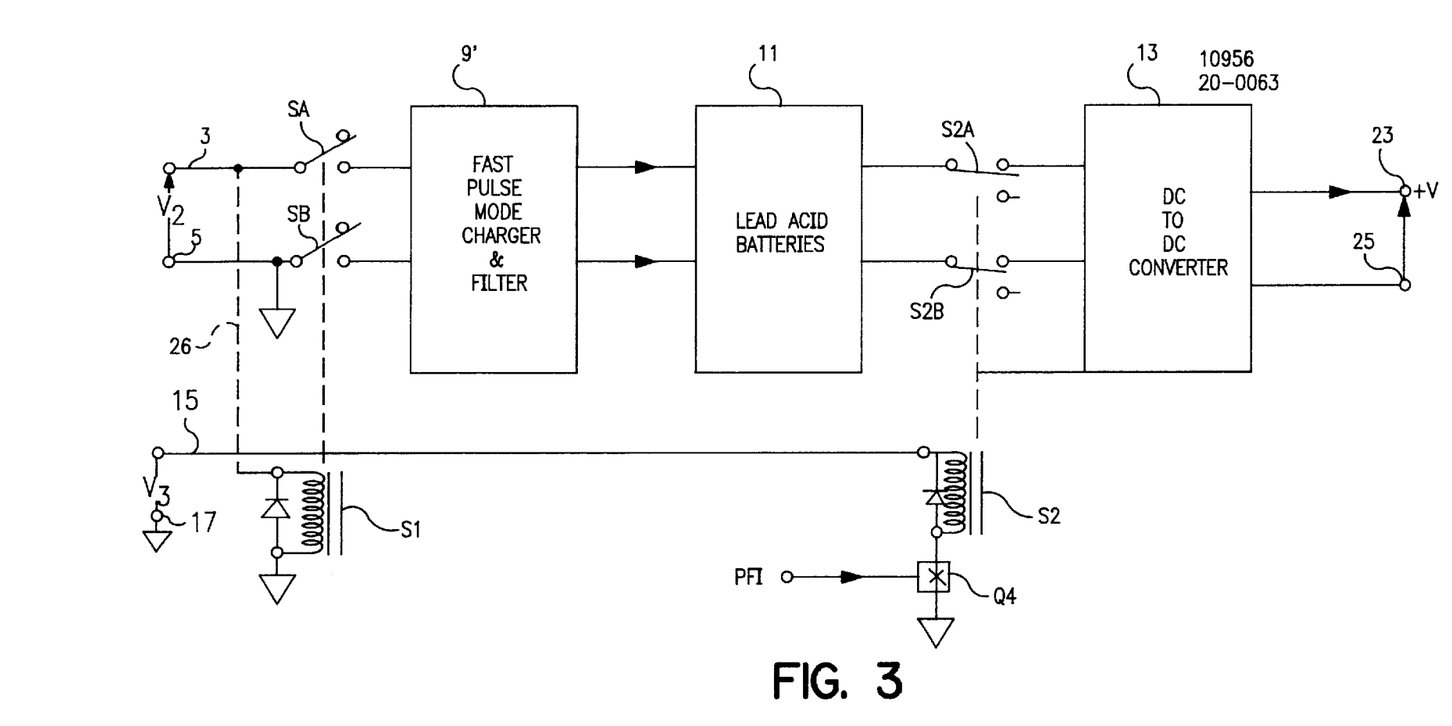
FIG. 3 is a simplified block diagram of the embodiment of FIG. 2.

A simplified partial block diagram of the foregoing embodiment is presented in FIG. 3. In this figure, the standby power supply is shown in the condition in which the external generator is turned off and the standby power supply is outputting DC power from the lead acid batteries 11 to the associated electronic apparatus to which it is dedicated. With the turbine generator turned off, no voltage is supplied over either leads 3 and 5, or leads 15 and 17, or over the PFI lead, and relays S1 and S2 are not energized. Relay contacts SA and SB open the input circuit to the fast pulse mode charger and filter 9' and relay break contacts S2A and S2B complete the circuit from batteries 11 to the input of DC to DC converter 13. The DC to DC converter up-converts the DC voltage at the input and outputs at 23 and 25 a higher DC voltage, the requisite voltage required by the external electrical load, isolated from chassis ground.

When the aircraft's engines are turned on and operating properly, the associated turbine indirectly supplies DC power to both inputs 3 and 5 at voltage V2 and at 15 and 17 at voltage V3, and a voltage is provided at PFI. Since voltage is present at PFI, electronic switch Q4 is biased conductive and conducts current. DC current from the driven sources applied over leads 15 and 17 energizes both relays and, maintains the relays energized. Energized, relay S2 opens its contacts, disconnecting battery pack 11 from the input of DC-to-DC converter 13. There is no output from the converter. Relay S1 closes its contacts, SA and SB, completing a DC power circuit via leads 3 and 5 to the input of filter-battery charger 9'. The charger then supplies the current to replenish and trickle charge the batteries in battery pack 11.

Should the aircraft's generator drop off in voltage, as occurs when it is being shut down, the PFI voltage terminates, which un-biases Q4 to its non-conductive state. Transistor Q4 thereby switches off, terminating current through the coil of relay S2. Relay S2 immediately deenergizes and closes its contacts, connecting the battery pack through to the DC-to-DC converter 13. This occurs even while relay S1 is still receiving energizing current over leads 15 and 17 and its contacts remains closed. Thus converter 13 commences generating a DC output, for a short interval before charger 9' ceases charging the battery pack.

Figure 4:
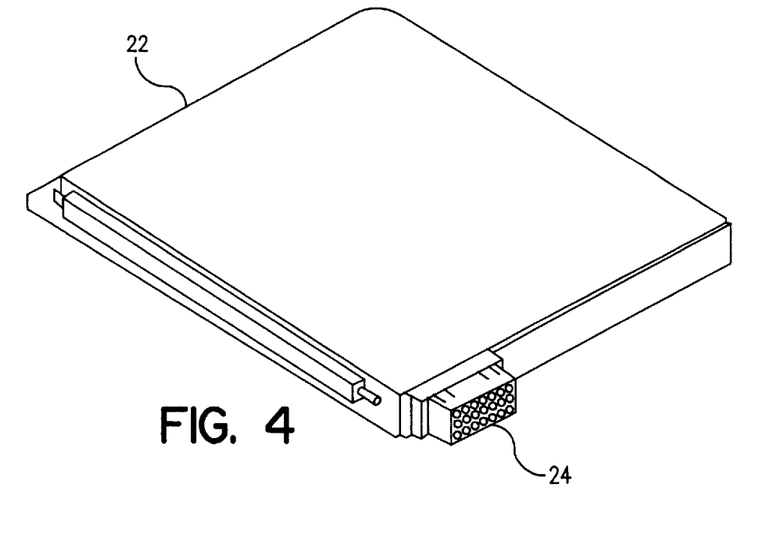
FIG. 4 is a pictorial view of the SEME format container which confines the power supply circuitry.

The foregoing embodiment is conveniently packaged in the SEME configuration, illustrated in FIG. 4. The container is a thin rectangular shaped configuration with an electrical connector 24 at one end. Leads 3, 5, 15, 17, 23, 25 and I1, and I2 illustrated in FIG. 2, are wired to appropriate positions on the connector. The connector mates with a complementary connector in the equipment rack that is wired to the appropriate distribution and equipment circuits. In a practical embodiment, the container is of dimensions approximately 6.7 inches in length, 6 inches in width and 0.6 inches in thickness. The container slides into place within an equipment rack on the aircraft. Typically, alongside the electronics apparatus to be supplied with standby power that is confined within a like package or container, also fitted within the equipment rack. The foregoing assembly permits the power supply to be easily removed and replaced by maintenance personnel.

To meet that size requirement, small size electromagnetic relays are required for relays S1 and S2. Electromagnetic relays that satisfy that requirement are known as type TO-5 relays, such as available from Teledyne Relays as model S172, which have a low profile height of 0.37 inches and occupy an area of under 0.5 inch by 0.5 inch. Advantageously, that relay also has an operate time of 6.0 msec max and a release time of 3.0 msecs max. Batteries small in physical size must also be selected for the battery pack, such as the 2 volt, 3.2 ampere-hour batteries available from the Portable Energy Products, Inc of Mountain View, Calif. as model TLC02V32, which are about 4.6 inches in length by 2.5 inches in width by 5/16th of an inch thick.

In a practical apparatus based on the specific embodiment of FIG. 1, the components associated with the standby power supply have the following values: R8-100K ohms; C8-6.8 UF (Microfarads) ; C9-0.01 UF; C10-0.1 UF; R10-10K; C11-0.001 UF; C12-0.022 UF; R12-2.74K ohms; R13-280K ohms; R14-25.5K ohms; R15-274K ohms; R16-5.36K ohms; R17-0.075 ohms; Q3-PZT3904; CR1-1SR154; C3-10 UF; C4-0.01 UF; R3-1K; R6-330; L3-20 UH; C5-0.01 UF; C6-100 UF; C7-100 UF; Q2-1RF9Z34S; CR3-5245B; CR4-SW5804; Q1-PZT3904; the inductance of each of the windings of toroid T1 is 30 microhenries; the inductance of each of windings of T2 is 25 microhenries; and the inductance of each of windings of T3 is 12.5 microhenries. R1 and R2 are 5.1 ohms. The EMI filters half power points, also known as the "corner frequency", is 15 Khz. The foregoing practical embodiment of the invention is capable of supplying a +5V At 6 milliamperes of current for up to ten days.

Alternative embodiments of the standby power supply of FIGS. 1–3 become apparent. Reference is again made to FIG. 3. One apparent, but less effective, embodiment of the foregoing circuit is to eliminate the second source of voltage at leads 15 and 17, disconnecting those leads, and, instead, supply DC current to the electromagnetic relays from leads 3 and 5, as represented by dash line 26. Additionally, different relays would be substituted, containing electromagnetic coils that are appropriate to the voltage V2 presented between leads 3 and 5.

A still further embodiment, also less desirable, would be used in aircraft that do not contain a Power Failure Indicator. In such an alternative, switch Q2 should be eliminated and the end of the relay coil of relay S2 should be connected directly to chassis ground. For that embodiment, relay S1 should be of a slow to release type and relay S2 should be of a fast to release type. Those release timing requirements ensure that relay S2 closes its break contacts before the DC power at leads 3 and 5 and/or 15 and 17 completely terminates. While theoretically possible to achieve, the foregoing requires such high tolerances for the electromagnetic relay's operation as renders the alternative somewhat ambitious and impractical, particularly in aircraft.

Further, the latter two alternative embodiments may be combined to form still another embodiment, also less preferred.

It is believed that the foregoing description of the preferred embodiments of the invention is sufficient in detail to enable one skilled in the art to make and use the invention. However, it is expressly understood that the detail of the elements presented for the foregoing purpose is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. For use in combination with an aircraft electrical supply and distribution system that includes a DC generator having at least a first DC output to normally provide a voltage V1, a first DC distribution system for said first DC output, a main rechargeable battery connected to said first DC distribution system, a second DC output to normally provide a voltage V2, a second DC distribution system for said second DC output, and a power failure signaling system for monitoring said second DC output and supplying a power failure indication at an output thereof when said second DC output commences to fall in level from said voltage V2, whereby a power failure indication is provided for an interval before said second DC output drops fully to zero in voltage level, a standby power supply for aircraft electronic apparatus, said aircraft electronic apparatus being normally supplied with DC electrical power at said voltage V2 over said second DC distribution system, said standby power supply having a principal input for connection to said first DC distribution system, said principal input comprising a first polarity input and second polarity input, and an output for connection to said aircraft electronic apparatus for supplying DC electrical power to said aircraft electronic apparatus when the DC voltage on said second DC electrical distribution system drops below voltage V2 in the course of failure of said DC generator, comprising:

rechargeable battery means for storing electrical energy, said battery means having a first polarity output and a second polarity output, and said battery means having an output of voltage V3 between said first polarity output and said second polarity output, where said voltage V3 is less than said voltages V1 or V2;

a fast pulse mode battery charger;

said fast pulse mode battery charger having a charger input for receiving DC current, said charger input comprising a first polarity charger input and a second polarity charger input, and a charger output, said charger output connected to said rechargeable battery means for supplying DC charging current to said battery means responsive to DC current at said charger input;

DC to DC converter means;

said DC to DC converter means having first and second polarity inputs and an output for up-converting a DC voltage applied across said first and second polarity inputs to a second DC voltage at said output, said second DC voltage being of greater magnitude than said first DC voltage and said output of said DC to DC converter means providing said standby power supply output; said DC to DC converter means output providing DC electrical power at said voltage V2 to said aircraft electronic apparatus, responsive to the application of said battery output voltage V3 across said DC to DC converter inputs;

first electromagnetic relay means;

said first electromagnetic relay means including an electromagnetic coil means and first and second make relay contacts, said make relay contacts being normally open condition to open an electrical circuit there through when said electromagnetic coil means is unenergized and, responsive to energization of said electromagnetic coil means, for closing an electrical circuit there through;

said first make relay contacts being connected in series with said first polarity charger input of said fast pulse mode battery charger and said first polarity input of said principal input, and said second make relay contacts being connected in series with said second polarity charger input of said fast pulse mode battery charger and said second polarity input of said principal input, wherein said fast pulse mode battery charger input is electrically isolated from said principal input when said electromagnetic coil means of said first electromagnetic relay means is unenergized, and wherein an electrical current conducting circuit between said principal input and said fast pulse mode battery charger input is completed only when said electromagnetic coil means of said first electromagnetic relay means is energized;

said electromagnetic coil means of said first electromagnetic relay means being connected to said second DC distribution system for receiving DC energization current, responsive to said DC generator supplying said voltage V2 to said second distribution system, whereby said first relay means completes a current path to said input of said fast pulse mode battery charger when said DC generator is functioning, and interrupts said current path when said DC generator is not functioning;

second electromagnetic relay means;

said second electromagnetic relay means including electromagnetic coil means and first and second break relay contacts, said break relay contacts thereof being normally closed to complete an electrical circuit therethrough when said electromagnetic coil means thereof is unenergized and, responsive to energization of said electromagnetic coil means thereof, for opening said electrical circuit therethrough;

said first break relay contacts being connected in series between said first polarity output of said rechargeable battery means and said first polarity input of said DC to DC converter means; and said second break relay contacts being connected in series between said second polarity input of said DC to DC converter means and said second polarity output of said rechargeable battery means; wherein said rechargeable battery means output is connected to said DC to DC converter means to supply current to said DC to DC converter means only when said electromagnetic coil means of said second electromagnetic relay means is de-energized and wherein said rechargeable battery means output is disconnected from said DC to DC converter means when said electromagnetic coil means of said second electromagnetic relay means is energized;

semiconductor switch means; said semiconductor switch means having a control input and first and second output terminals for normally providing a current conducting path between said first and second output terminals during the absence of a power failure indication voltage at said control input;

said control input of said semiconductor switch means being connected to said power failure indication system output for receiving a power failure indication voltage when said DC generator is failing;

said electrical coil means of said second electromagnetic relay means being connected electrically in series with said first and second output terminals of said semiconductor switch means across said second DC distribution system, wherein said second DC distribution system provides energization current to said electromagnetic coil means of said second electromagnetic relay means in the absence of a power failure indication voltage at said control input of said semiconductor switch means, whereby said second electromagnetic relay means prevents energization of said DC to DC converter means, and said standby power supply cannot supply DC current to said electronic apparatus when said DC generator is functioning;

said semiconductor switch means being operable to switch into the electrically non-conducting state to discontinue energization of said second relay's electromagnetic coil means;

whereby, in the event said DC generator fails, said electromagnetic coil means of said second electromagnetic relay means deenergizes and said second electromagnetic relay mean's break relay contacts complete a current conducting circuit from said rechargeable battery means to said DC to DC converter means prior to deenergization of said electromagnetic coil of said first electromagnetic relay means; and said fast pulse mode battery charger is interrupted to discontinue charging of said rechargeable battery means upon deenergization of said first electromagnetic relay means.

2. The invention as defined in claim 1, wherein said fast pulse mode charger comprises:

electromagnetic interference filter means; and

Buck converter means, said Buck converter means having a first polarity input, a chassis ground polarity input; and a first polarity output; and said first polarity output being connected to said first polarity output of said rechargeable battery means.

3. The invention as defined in claim 2, wherein said electromagnetic interference filter means comprises:

a first toroidal transformer;

said first toroidal transformer including a core of magnetic material having the geometry of a torroid, first and second toroidal windings on said core, each of said first and second toroidal windings having a positive polarity end and a negative polarity end;

a second toroidal transformer:

said second toroidal transformer including a core of magnetic material having the geometry of a torroid, first and second toroidal windings on said core, each of said first and second toroidal windings having a positive polarity end and a negative polarity end;

a third toroidal transformer;

said third toroidal transformer including a core of magnetic material having the geometry of a torroid, first and second toroidal windings on said core, each of said first and second toroidal windings having a positive polarity end and a negative polarity end;

a filter first polarity input;

a filter second polarity input;

a filter first polarity output;

a filter chassis ground polarity output;

said positive polarity end of said first toroidal winding of said first toroidal transformer being connected to said filter first polarity input;

said negative polarity end of said first toroidal winding of said first toroidal transformer being connected to the positive polarity end of said first winding of said second toroidal transformer;

said negative polarity end of said first winding of said second toroidal transformer being connected to said filter first polarity output, wherein a series circuit is formed between said filter first polarity input and said filter first polarity output;

said negative polarity end of said second toroidal winding of said first toroidal transformer being connected to said filter second polarity input;

said positive polarity end of said second toroidal winding of said first toroidal transformer being connected to said negative polarity end of said second toroidal winding of said second toroidal transformer wherein a series circuit is formed between said filter second polarity input and said filter chassis ground polarity output;

said positive polarity end of said first toroidal winding of said third toroidal transformer being connected to said negative polarity end of said first toroidal winding of said second toroidal transformer; and said negative polarity end of said first winding of said third toroidal transformer being connected to said filter first polarity output;

said negative polarity end of said second winding of said third toroidal transformer being connected to said positive polarity end of said second toroidal winding of said second toroidal transformer; and said positive polarity end of said second winding of said third toroidal transformer being connected to said filter chassis ground polarity output;

first capacitor means; said first capacitor means being connected between said positive polarity end of said first winding of said first toroidal transformer and said negative polarity end of said second winding of said first toroidal transformer; and second capacitor means; said second capacitor means being connected between said negative polarity end of said first winding of said first toroidal transformer and said positive polarity end of said second winding of said first toroidal transformer.

4. The invention as defined in claim 3, wherein said filter first polarity input of said electromagnetic interference filter means is connected to a contact of said first make relay contacts of said first electromagnetic relay means; and said second polarity input of said electromagnetic interference filter means is connected to a contact of said second make relay contacts of said first electromagnetic relay means; and wherein said first polarity output of said electromagnetic interference filter means is connected to said first polarity input of said Buck converter means; and wherein said filter chassis ground polarity output of said electromagnetic interference filter means is connected to said chassis ground polarity input of said Buck converter means.

5. The invention as defined in claim 4, further comprising:

duty cycle control means for controlling conduction of said Buck converter means;

said duty cycle control means including:

temperature sensing means for sensing temperature of said rechargeable battery means;

voltage monitoring means for monitoring the voltage of said rechargeable battery means;

current monitoring means for monitoring current through said rechargeable battery means;

said duty cycle control means for adjusting the duty cycle of said Buck converter means in dependence upon the battery voltage sensed by said voltage monitoring means; and current source means for supplying energizing current to said duty cycle control means when said first relay means is energized.

6. The invention as defined in claim 5, further comprising:

container means; said container means housing each of said electromagnetic interference filter means, fast pulse mode battery charger, rechargeable battery means and said first and second electromagnetic relay means; and said container means having a generally rectangular geometry no greater in dimension than 6 inches by 6.75 inches by 0.6 inches to define a shallow rectangular geometry.

7. The invention as defined in claim 6, wherein said output of said DC to DC converter means further comprises: diode means for permitting current flow from said output of said DC to DC converter means while preventing current flow there into.

8. A standby power supply for electronic apparatus, said electronic apparatus normally being supplied with electrical power by an engine driven DC generators comprising:

first switching means having a first and second state, said first switching means being placed in said first state, responsive to said DC generator generating DC power, and switchable to said second state, responsive to failure of said DC generator;

second switching means having a first and second state, said second switching means being placed in said first state, responsive said DC generator generating power, and switchable to said second state, responsive to failure of said DC generator;

rechargeable battery means;

battery charger means; said battery charger means having an input for receiving DC power from said DC generator and having an output connected to said rechargeable battery means for applying DC charging current to said rechargeable battery means responsive to said first switching means being in said first state;

means for supplying current from said rechargeable battery means to said electronic apparatus responsive to said second switching means being in said second state;

said first switching means being switchable from said first state to said second state in a predetermined period of time, T1, responsive to failure of said DC generator;

said second switching means being switchable from said first state to said second state in a predetermined period of time, T2, responsive to failure of said DC generator; and wherein said period of time T1>T2; whereby application of DC current from said rechargeable battery means to said electronic apparatus overlaps in time application of DC current to said battery means from said battery charger means by a short interval, T1=T2, to ensure continuity of DC current to said electronic apparatus.

9. A dedicated standby power supply for an aircraft electronic apparatus, said aircraft electronic apparatus being normally served with DC power from an aircraft power generator over an aircraft electrical distribution system containing a first line normally at a first voltage relative to ground potential, and a second line normally at a second voltage relative to ground potential, said second voltage being of lower level than said first voltage, and further containing a third line for normally providing a power on indication responsive to presence of said second voltage on said second line and alternately providing a power failure indication responsive to a predetermined falloff in level of said second voltage on said second line from a first level to a second lower level, indicative of failure of said aircraft power generator; said second lower level being greater than zero volts, comprising:

first relay means, said first relay means having an electromagnetic coil connected to said second line for receiving energizing current therefrom;

second relay means, said second relay means having an electromagnetic coil connected to said second line for receiving energizing current therefrom;

semiconductor switch means having a control input and first and second output terminals;

means for connecting said control input to said third line; and means for connecting said electromagnetic coil of said second relay means and said output terminals of said semiconductor switch means in series circuit with said second line;

said semiconductor switch means normally providing a current conducting path between said first and second output terminals thereof during the presence of said power on indication, whereby said electromagnetic coil of second relay means receives energizing current from said second line;

rechargeable battery means;

battery charger means;

said battery charger means having an input and an output;

said battery charger means output being connected to said rechargable battery means for supplying charging current to said rechargeable battery means, responsive to said battery charger means receiving DC current from said first line;

said first relay means including make contact means for connecting said first line to said battery charger means input responsive to energization of said electromagnetic coil of said first relay means;

DC-to-DC converter means, having an input and an output, for converting DC applied at said input to ungrounded DC voltage at said output;

said second relay means for connecting said rechargeable battery means to said input of said DC-to-DC converter means, responsive to said semiconductor switch means being in an electrically non-conductive state, wherein said electromagnetic coil of said second relay means no longer receives energizing current;

wherein, responsive to appearance of a power failure indication at said third line, said second relay means connects said DC-to-DC converter means input to said rechargeable battery means prior to said voltage at said first and second lines decreasing to ground potential and the de-energization of said electromagnetic coil of said first relay means; whereby said DC-to-DC converter means supplies ungrounded voltage to said aircraft electronic apparatus before said aircraft power generator completely ceases to supply DC power to said aircraft electrical distribution system.

* * * * *